United States Patent
Wakabayashi

(10) Patent No.: US 10,281,724 B2
(45) Date of Patent: May 7, 2019

(54) IMAGE DISPLAY DEVICE

(71) Applicant: Seiko Epson Corporation, Tokyo (JP)

(72) Inventor: Shuichi Wakabayashi, Okaya (JP)

(73) Assignee: Seiko Epson Corporation (JP)

( * ) Notice: Subject to any disclaimer, the term of this patent is extended or adjusted under 35 U.S.C. 154(b) by 241 days.

(21) Appl. No.: 15/208,702

(22) Filed: Jul. 13, 2016

(65) Prior Publication Data

US 2017/0017082 A1 Jan. 19, 2017

(30) Foreign Application Priority Data

Jul. 16, 2015 (JP) .................................. 2015-142401

(51) Int. Cl.
| | |
|---|---|
| *G02B 27/01* | (2006.01) |
| *G02B 26/10* | (2006.01) |
| *G06F 3/147* | (2006.01) |
| *G09G 3/00* | (2006.01) |

(52) U.S. Cl.
CPC ......... *G02B 27/0172* (2013.01); *G02B 26/10* (2013.01); *G02B 27/017* (2013.01); *G06F 3/147* (2013.01); *G09G 3/002* (2013.01); *G02B 2027/011* (2013.01); *G02B 2027/014* (2013.01); *G02B 2027/0174* (2013.01); *G02B 2027/0178* (2013.01); *G09G 2360/14* (2013.01)

(58) Field of Classification Search
CPC ........ G02B 2027/011; G02B 2027/014; G02B 2027/0174; G02B 2027/0178; G02B 26/10; G02B 27/017; G02B 27/0172; G06F 3/147; G09G 2360/14; G09G 3/002
See application file for complete search history.

(56) References Cited

U.S. PATENT DOCUMENTS

| | | | |
|---|---|---|---|
| 8,547,618 B2 | 10/2013 | Sugiyama et al. | |
| 2005/0234348 A1* | 10/2005 | Watanabe | G02B 26/06 600/476 |
| 2009/0316115 A1* | 12/2009 | Itoh | G02B 27/0093 353/20 |
| 2011/0102874 A1* | 5/2011 | Sugiyama | G02B 26/101 359/205.1 |

FOREIGN PATENT DOCUMENTS

| | | |
|---|---|---|
| JP | 2006-053321 A | 2/2006 |
| JP | 2010-243972 A | 10/2010 |
| WO | WO-2010-116726 A1 | 10/2010 |

* cited by examiner

*Primary Examiner* — Viet D Pham

(74) *Attorney, Agent, or Firm* — Harness, Dickey & Pierce, P.L.C.

(57) ABSTRACT

An image display device is used by being mounted on an observer, and includes: a frame section that includes a front section and a temple section; a modulated light generation section, a scan section that is arranged in the temple section and scans the modulated light which is emitted from the modulated light generation section; a deflection section that is arranged in the front section and deflects the modulated light which is scanned by the scan section toward the eye of the observer; and a detection section that detects the modulated light which is reflected in the deflection section.

17 Claims, 16 Drawing Sheets

IMAGE DISPLAY DEVICE

BACKGROUND

1. Technical Field

The present invention relates to an image display device.

2. Related Art

As one of an image display technology of a Head Mounted Display (HMD), a display device, which causes the retinas of eyes to be irradiated with lasers and causes a user to visually recognize an image, has been gaining attention in recent years (for example, refer to International Publication WO2010/116726).

International Publication WO2010/116726 discloses a glasses-type head mounted display. Further, a configuration illustrated in FIG. 4 of International Publication WO2010/116726 includes a laser light source, a scan section which scans laser light which is emitted from the laser light source, a deflection section which deflects the light which is scanned by a scan section, and a fixing lens which is arranged between the scan section and the deflection section and is configured to control the location of the beam waist of the laser light, and the above sections are maintained in a frame.

However, in the configuration, the laser light source and the scan section are arranged in a temple section (portion for hanging on the ear) of the glasses-type frame, and the deflection section is arranged in the front section (portion for supporting the lens). In the configuration, the relative locations of the scan section and the deflection section are deviated from proper locations due to a deformation of the frame, which is generated in a case in which the head mounted display is mounted on the head, and thus an image which is observed by the user is deviated.

SUMMARY

An advantage of some aspects of the invention is to provide an image display device which can suppress image shift due to bending of a frame.

The advantage can be achieved by the invention described below.

An image display device according to an aspect of the invention is used by being mounted on an observer and includes: a frame section that includes a front section and a temple section which is connected to the front section; a scan section that is arranged in the temple section, and is configured to scan light which is emitted from a light source; a deflection section that is arranged in the front section, and is configured to deflect light, which is scanned by the scan section, of the light which is emitted from the light source toward the eyes of the observer; and a detection section that detects light, which is reflected in the deflection section, of the light which is scanned by the scan section.

With this configuration, since it is possible to detect the bending of a frame by the detection section, it is possible to provide an image display device which can suppress image shift due to the bending of the frame.

In the image display device according to the aspect of the invention, it is preferable that the deflection section is a hologram element, and the detection section detects light, which is regularly reflected by the hologram element, of light which is incident into the hologram element.

For example, in a case in which the diffracted light of the hologram element is deflected toward the eye of a wearer, the detection section detects light which is different from the diffracted light, and thus it is easy to arrange the detection section in a place in which a field of vision is not obscured.

An image display device according to another aspect of the invention is used by being mounted on an observer and includes: a frame section that includes a front section and a temple section which is connected to the front section; a scan section that is arranged in the temple section, and is configured to scan light which is emitted from a light source; a deflection section that is arranged in the front section, and is configured to deflect light, which is scanned by the scan section, of the light which is emitted from the light source toward the eyes of the observer; and a detection section that detects light, which penetrates the deflection section, of the light which is scanned by the scan section.

With this configuration, since it is possible to detect the bending of the frame by the detection section, it is possible to provide an image display device which can suppress image shift due to the bending of the frame.

It is preferable that the image display device according to the aspect of the invention further includes a control section that controls drive of the light source based on a result of detection performed by the detection section.

With this configuration, it is possible to display the image in a correct location by changing, for example, timing, in which the light is emitted from the light source, based on the bending of the frame.

It is preferable that the image display device according to the aspect of the invention further includes an optical section which is located between the deflection section and the detection section, and causes the light, which is reflected in the deflection section, or the light, which penetrates the deflection section, of the light, which is scanned by the scan section, to penetrate therethrough.

With this configuration, for example, it is possible to cut off outside light by the optical section, and it is possible to more accurately detect light by the detection section.

In the image display device according to the aspect of the invention, it is preferable that the scan section includes a reflection section that reflects the light which is emitted from the light source, and, if an optical axis of the light, which is scanned by the scan section, of the light, which is emitted from the light source, is changed against the deflection section, inclination of the reflection section is changed at a time in which the detection section detects the light, which is reflected in the deflection section, or the light, which penetrates the deflection section, of the light which is scanned by the scan section.

With this configuration, it is possible to detect the shift of the optical axis based on the inclination of the reflection section.

In the image display device according to the aspect of the invention, it is preferable that, if the temple section is deformed, the optical axis of the light, which is scanned by the scan section, of the light, which is emitted from the light sources, is changed.

With this configuration, since the deformation of the deflection section is suppressed, it is possible to prevent image quality from being deteriorated.

In the image display device according to the aspect of the invention, it is preferable that the optical axis is changed while an incident angle of the light, which is emitted from the light source, on the scan section is fixed.

With this configuration, it is possible to prevent the light, which is emitted from the light source, from not being incident into the scan section.

In the image display device according to the aspect of the invention, it is preferable that, if a direction of the scan section against the deflection section is changed while the relative locational relationship between the light source and the center of the reflection section is fixed, the optical axis of the light, which is scanned by the scan section, of the light, which is emitted from the light sources, is changed.

With this configuration, the length of the optical path of the light, which is scanned by the scan section, up to the deflection section is not changed much. Therefore, the control section performs control without taking the change in the length of the optical path into consideration, thereby being simple.

In the image display device according to the aspect of the invention, it is preferable that the detection section detects light, which is reflected on a side of the detection section in a front section extension direction of a scan area in the deflection section, or the light, which penetrates the detection section, of light scanned by the scan section.

With this configuration, it is possible to realize a simple configuration in which the detection section detects light in one of a case in which the frame is not bent in a natural state, and a case in which the frame is bent because the image display device is mounted, and does not detect light in the other case.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferable embodiments of an image display device according to the invention will be described with reference to the accompanying drawings.

First Embodiment

Figure 1:
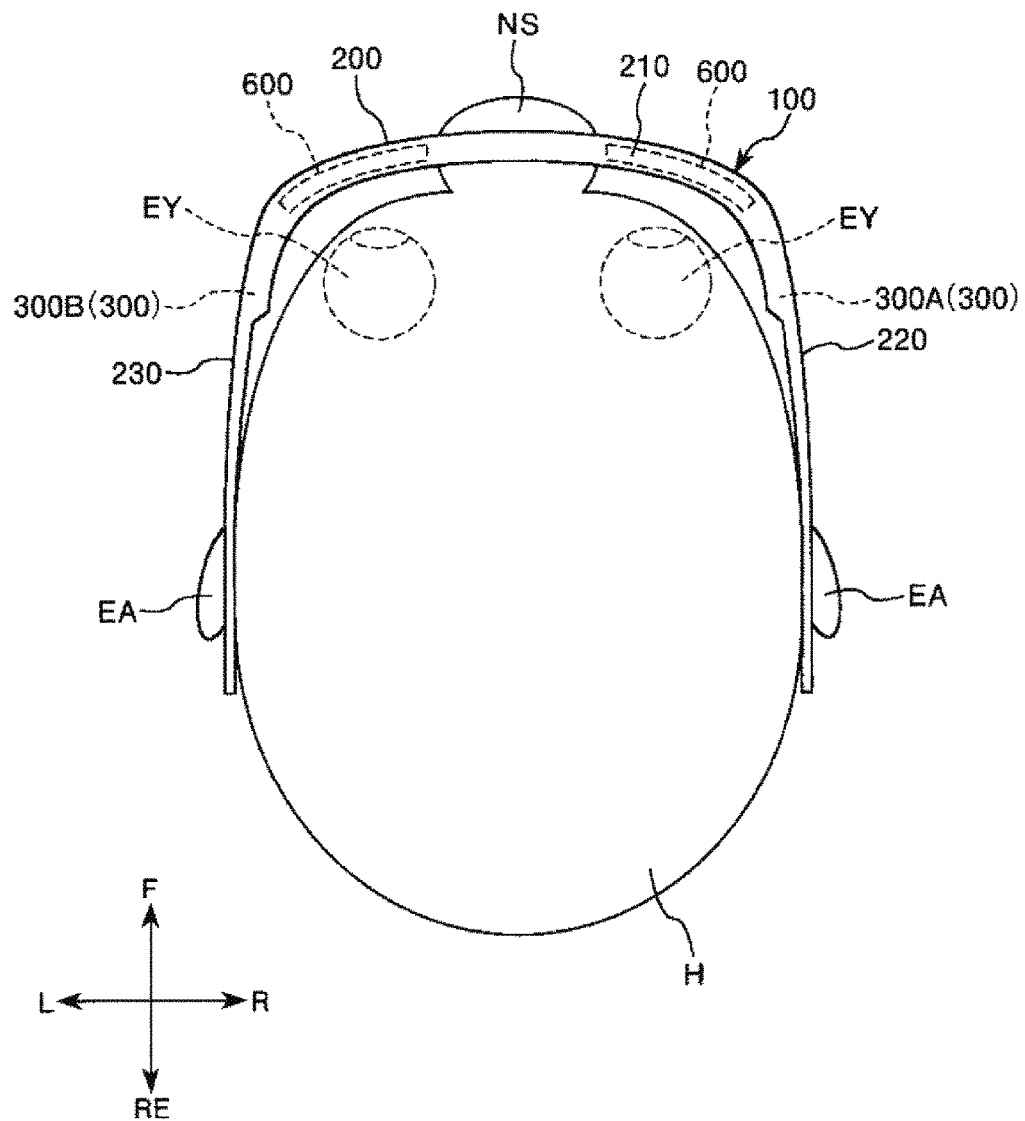
FIG. 1 is a diagram illustrating a schematic configuration of an image display device according to a first embodiment of the invention.
Figure 2:
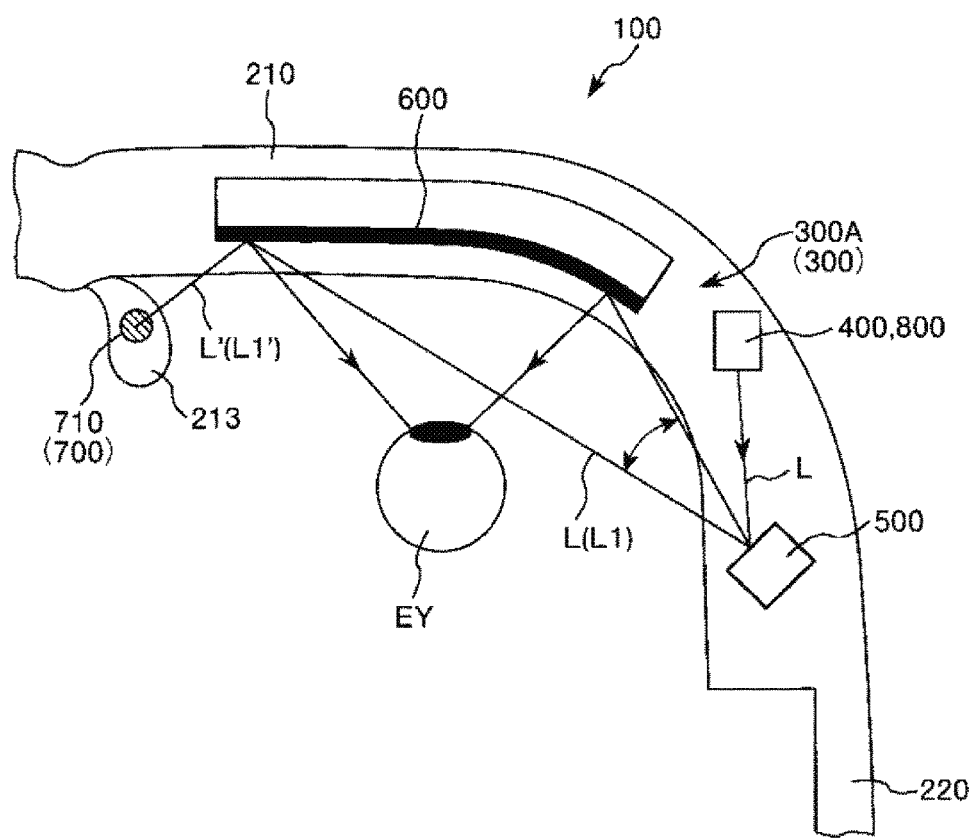
FIG. 2 is a schematic configuration diagram illustrating a display unit of the image display device illustrated in FIG. 1.
Figure 3:
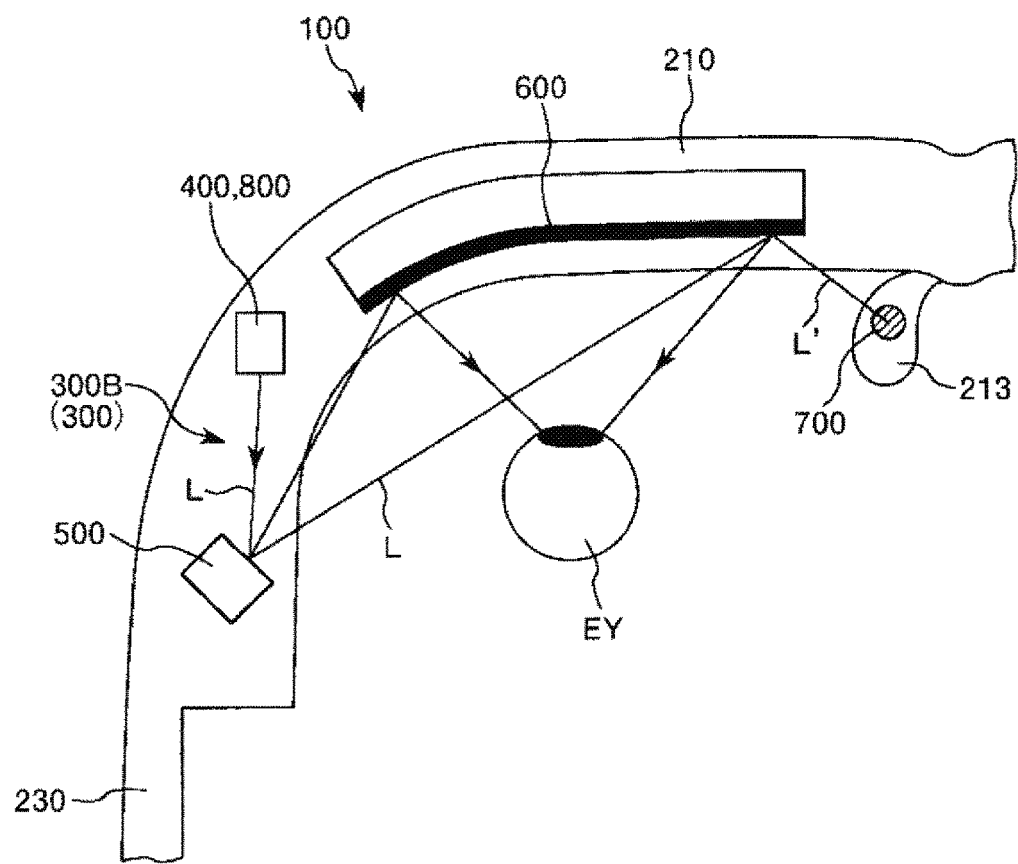
FIG. 3 is a schematic configuration diagram illustrating the display unit of the image display device illustrated in FIG. 1.
Figure 4:
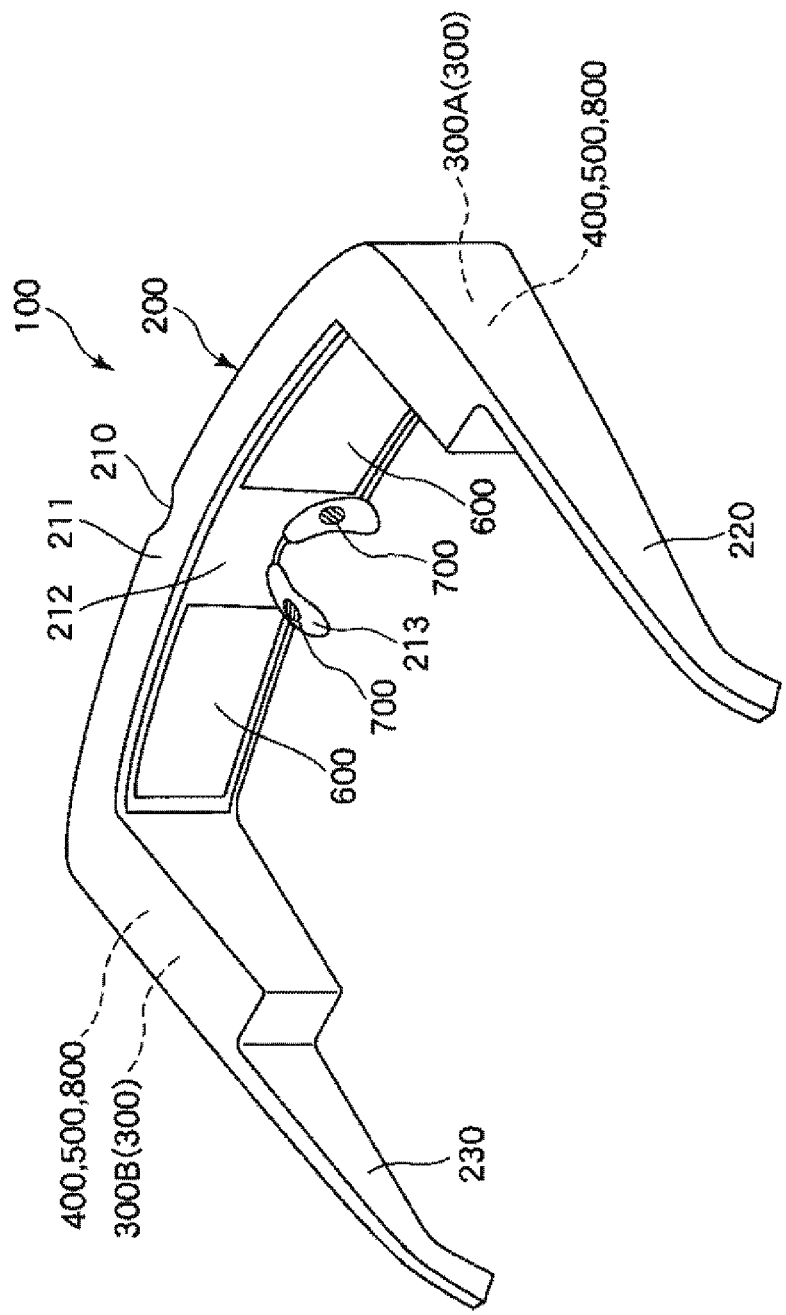
FIG. 4 is a perspective diagram illustrating the image display device illustrated in FIG. 1.
Figure 5:
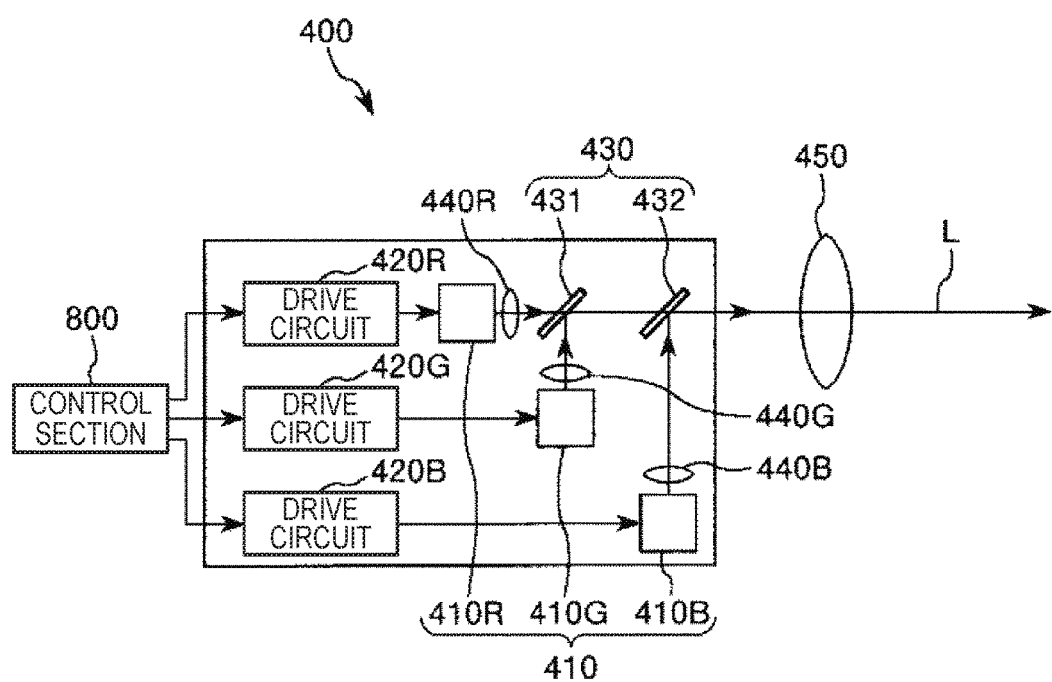
FIG. 5 is a diagram illustrating a modulated light generation section included in the display unit.
Figure 6:
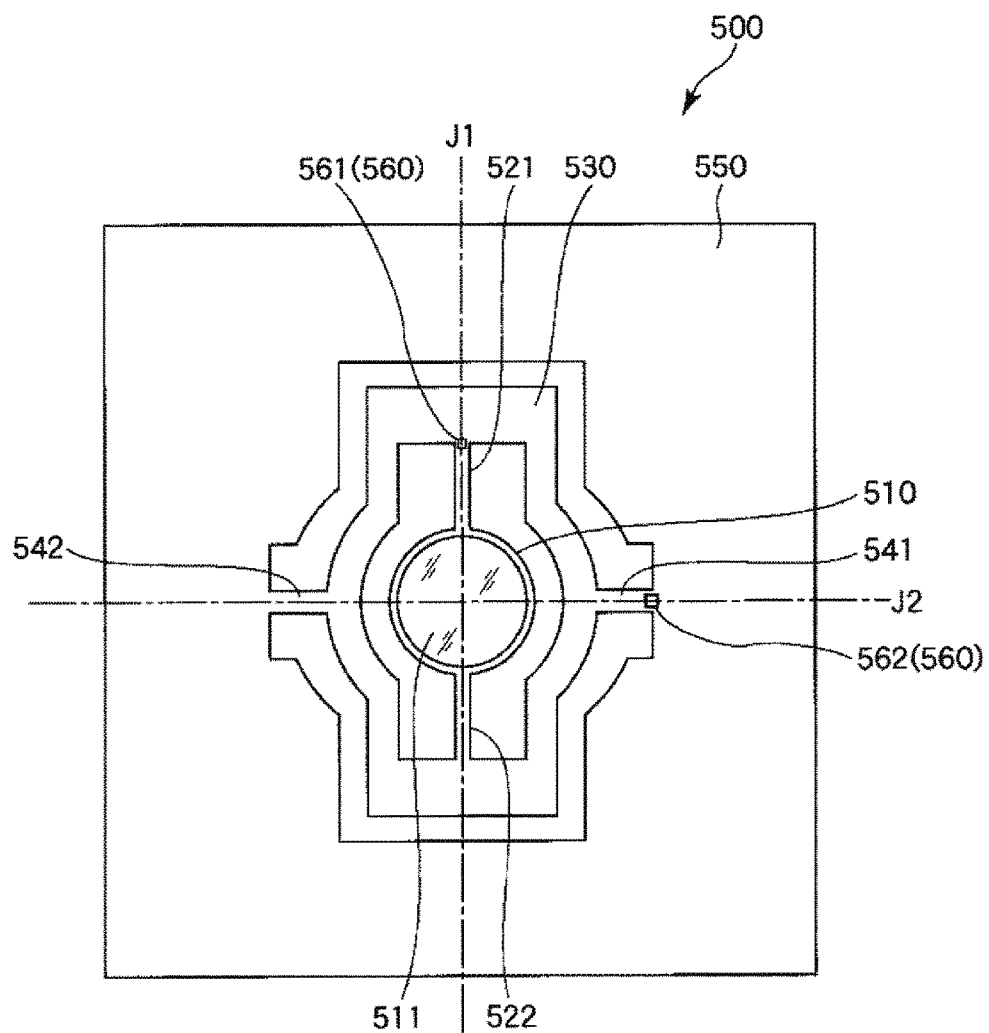
FIG. 6 is plan diagram illustrating a scan section which is included in the display unit.
Figure 7A:
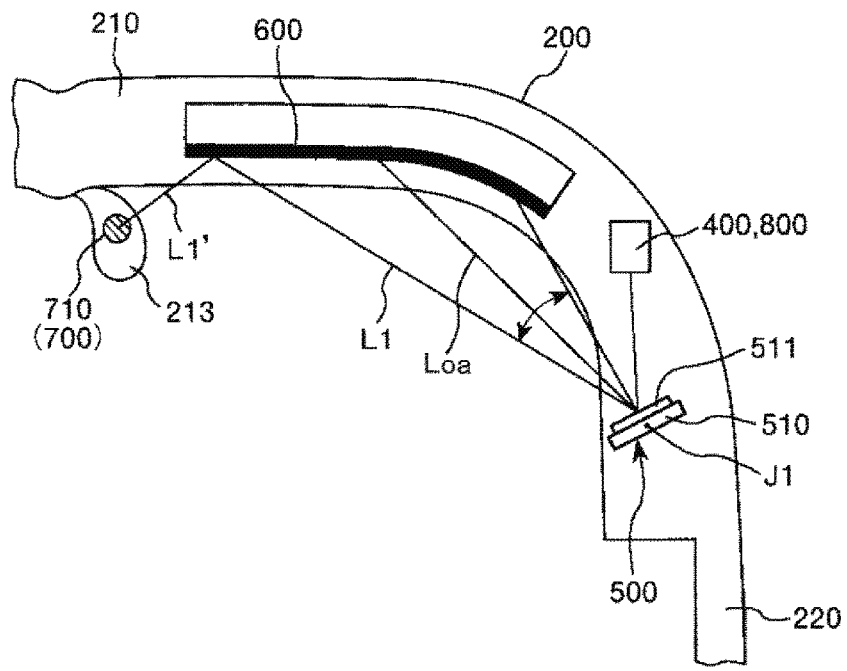
FIGS. 7A and 7B are diagrams illustrating the difference in an optical axis according to whether or not a frame is bent and deformed.
Figure 7B:
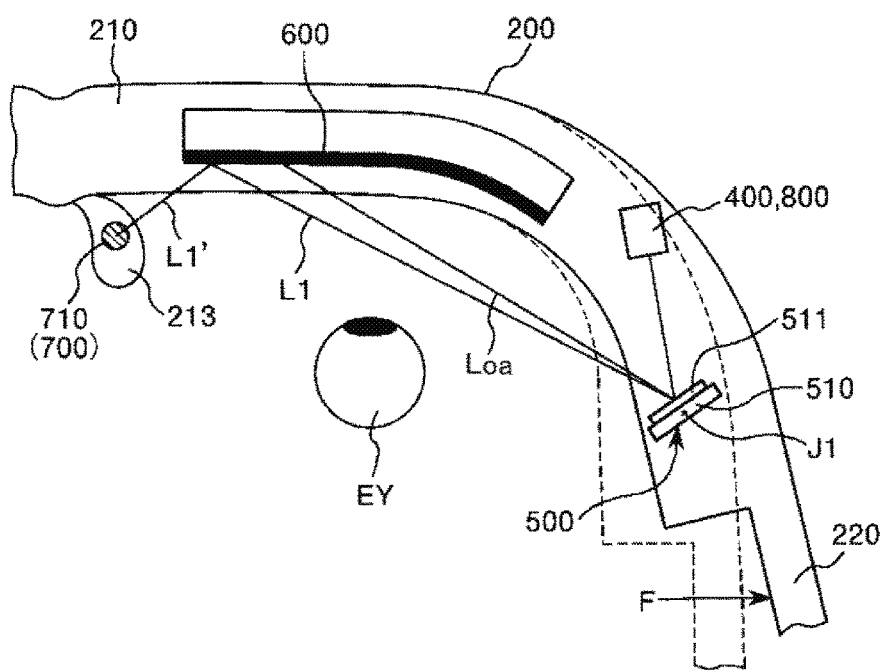
Figure 8A:
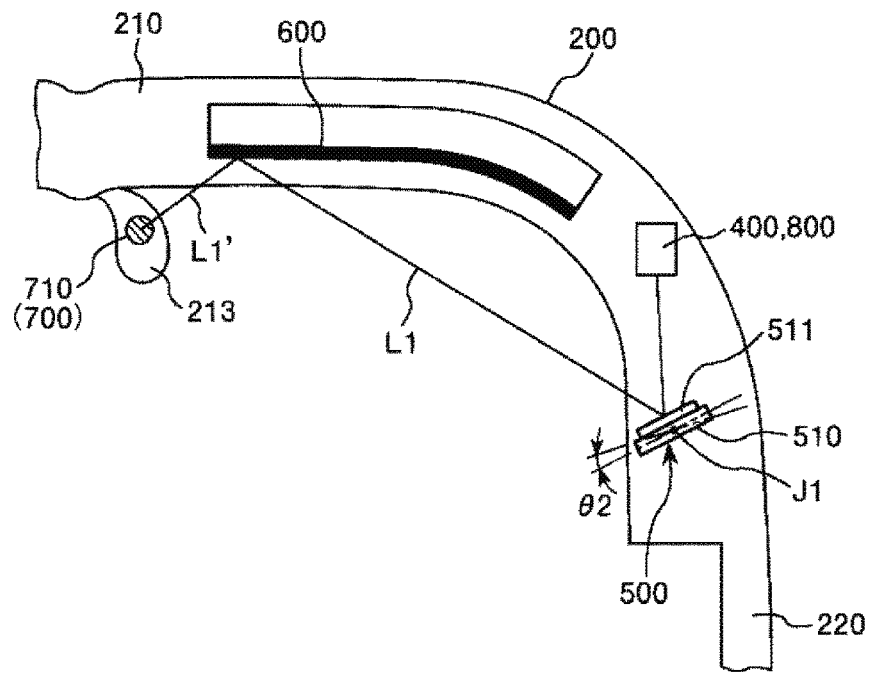
FIGS. 8A and 8B are diagrams illustrating the difference in an optical angle of the scan section according to whether or not the frame is bent and deformed.
Figure 8B:
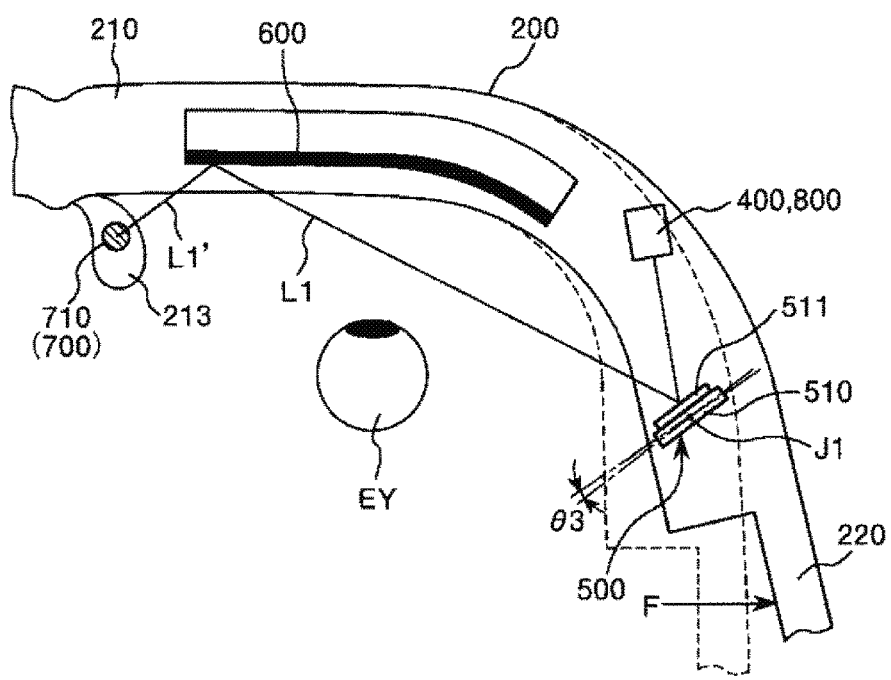
Figure 9:
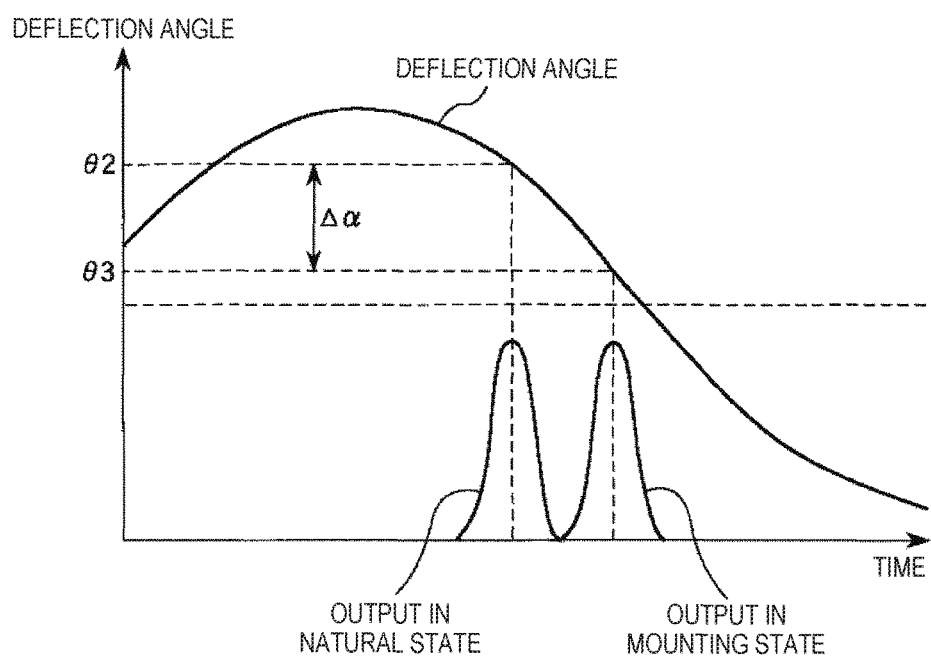
FIG. 9 is a graph illustrating the difference in light receiving timing of a light receiving element according to whether or not the frame is bent and deformed.
Figure 10:
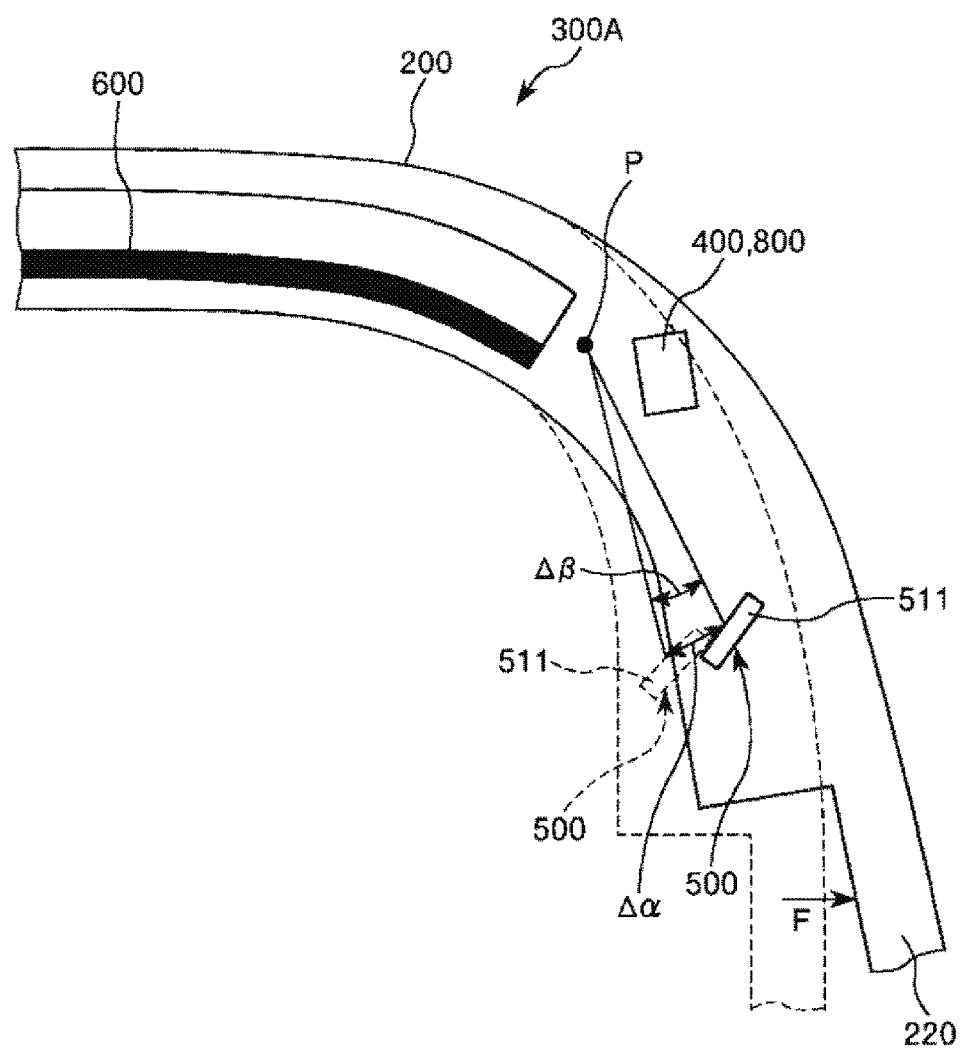
FIG. 10 is a diagram illustrating a method of bending the frame.

FIG. 1 is a diagram illustrating a schematic configuration of an image display device according to a first embodiment of the invention. FIGS. 2 and 3 are schematic configuration diagrams illustrating a display unit of an image display device illustrated in FIG. 1, respectively. FIG. 4 is a perspective diagram illustrating the image display device illustrated in FIG. 1. FIG. 5 is a diagram illustrating a modulated light generation section included in the display unit. FIG. 6 is plan diagram illustrating a scan section which is included in the display unit. FIGS. 7A and 7B are diagrams illustrating the difference in an optical axis according to whether or not a frame is bent and deformed. FIGS. 8A and 8B are diagrams illustrating the difference in an optical angle of the scan section according to whether or not the frame is bent and deformed. FIG. 9 is a graph illustrating the difference in light receiving timing of a light receiving element according to whether or not the frame is bent and deformed. FIG. 10 is a diagram illustrating a method of bending the frame. Meanwhile, hereinafter, for convenience of explanation, for an observer, a right side is referred to as "right", a left side is referred to as "left", the front (front side) is referred to as "front", and the rear (rear side) is referred to as "back". In addition, in FIG. 1, a right side is illustrated as "R", the left side is illustrated as "L", the front is illustrated as "F", and the rear is illustrated as "RE".

An image display device 100 illustrated in FIG. 1 is a head-mounted image display device. The image display device 100 has an appearance as glasses, is used by being mounted on the head H of the observer, and causes the observer to visually recognize an image made by a virtual image in a state in which the image is superimposed on an external world image.

As illustrated in FIG. 1, the image display device 100 includes a frame 200, and a display unit 300 which is supported by the frame 200. In addition, the display unit 300 includes a display unit 300A which is provided for the right eye of the observer, and a display unit 300B which is provided for the left eye of the observer.

Each of the display units 300A and 300B has the same configuration, and includes a modulated light generation section 400, a scan section 500, a deflection section 600, a detection section 700, and a control section 800, as illustrated in FIGS. 2 and 3. Each of the display units 300A and 300B is configured such that the modulated light generation section 400 generates modulated light L based on an image signal from the control section 800, the scan section 500 two-dimensionally scans the modulated light L, and the deflection section 600 deflects the modulated light L, which is scanned by the scan section 500, toward the eye EY of the observer, further, the detection section 700 detects the bending of the frame 200, and the control section 800 controls the drive of the modulated light generation section 400 based on the result of the detection.

If the display unit 300 is provided, it is possible to cause the observer to visually recognize an image (virtual image) according to the image signal. Meanwhile, although the image display device 100 according to the embodiment is a head mounted display for both eyes, the image display device 100 may be a head mounted display for one eye. That is, one of the display units 300A and 300B may be omitted.

Hereinafter, each of the components of the image display device 100 will be sequentially described in detail.

Frame

As illustrated in FIG. 4, the frame 200 has a shape such as a glasses frame, and supports the display units 300A and 300B. In addition, the frame 200 includes a front section 210 which is located in front of the eyes EY of the observer, and a pair of temple sections 220 and 230 which extend from both the left and right sides of the front section 210.

In addition, the front section 210 includes a rim section 211, a shade section 212 and a nose pad 213 which are supported by the rim section 211. The shade section 212 has a function of suppressing outside light from penetrating, and supports the deflection section 600. Further, the nose pad 213 is provided at the center of the shade section 212. The nose pad 213 comes into contact with the nose NS of the observer in a case in which the observer wears the image display device 100 on the head H, and supports the image display device 100 against the head H of the observer. In addition, detection section 700 is provided in the nose pad 213.

The temple sections 220 and 230 are connected to the front section 210. The temple sections 220 and 230 are straight temple sections which are hung on the ears EA of the observer, thereby being almost not angled, and are configured such that parts of the temple sections 220 and 230 come into contact with the ears EA of the observer in a case in which the observer wears the image display device 100 on the head H. Meanwhile, the temple sections 220 and 230 may be foldable against the front section 210 or may not be foldable.

Hereinabove, the frame 200 has been described. If the shape of the frame 200 can be mounted on the head H of the observer and can support the display unit 300, the frame 200 is not limited to the frame illustrated in the drawings.

Modulated Light Generation Section

The modulated light generation section 400 of the display unit 300A is arranged in the temple section 220, and the modulated light generation section 400 of the display unit 300B is arranged in the temple section 230. As illustrated in FIG. 5, the modulated light generation section 400 includes a light source section 410 that includes a plurality of light sources 410R, 410G, and 410B having different wavelengths, drive circuits 420R, 420G, and 420B that drive the light sources 410R, 410G, and 410B, collimator lenses 440R, 440G, and 440B that collimate light which is emitted from the light sources 410R, 410G, and 410B, a light synthesis section 430, and a condensing lens 450.

The light source 410R is a laser light source that emits red laser light, the light source 410G is a laser light source that emits green laser light, and the light source 410B is a laser light source that emits blue laser light. If the pieces of three-color light are used, it is possible to display a full-color image. As above, if laser light sources are used as the light sources 410R, 410G, and 410B, it is possible to display a further bright and clear image. Meanwhile, although the light sources 410R, 410G, and 410B are not particularly limited, it is possible to use, for example, a laser diode, an LED, or the like.

The drive circuit 420R has a function of driving the light source 410R, the drive circuit 420G has a function of driving the light source 410G, and the drive circuit 420B has a function of driving the light source 410B. In addition, the drive circuits 420R, 420G, and 420B are independently driven by the control section 800. Three pieces of laser light emitted from the light sources 410R, 410G, and 410B which are driven by the drive circuits 420R, 420G, and 420B are respectively collimated by the collimator lenses 440R, 440G, and 440B and are incident into the light synthesis section 430.

The light synthesis section 430 synthesizes the pieces of laser light from the light sources 410R, 410G, and 410B. In the embodiment, the light synthesis section 430 includes two dichroic mirrors 431 and 432. The dichroic mirror 431 has a function of causing red light to be penetrated and reflecting green light, and the dichroic mirror 432 has a function of causing red light and green light to be penetrated and reflecting blue light. If the dichroic mirrors 431 and 432 are used, pieces of three-color light, including red light, green light and blue light, from the light sources 410R, 410G, and 410B are synthesized. At this time, the intensities of the pieces of laser light from the light sources 410R, 410G, and 410B are independently modulated by the control section 800, respectively, thereby acquiring the modulated light L having a prescribed color. Furthermore, the generated modulated light L is changed to a desired NA (the number of openings) by the condensing lens 450, and is led to the scan section 500.

Hereinabove, the configuration of the modulated light generation section 400 has been described. However, the configuration of the modulated light generation section 400 is not limited to the configuration according to the embodiment if it is possible to generate the modulated light L. For example, if it is possible to generate the modulated light L, the modulated light generation section 400 may be arranged in a place other than the frame 200, and may lead the modulated light L to an emission location of the temple section 220 through an optical fiber or the like. For example, the modulated light generation section 400 may be stored in a housing which is different from the image display device 100, and may lead the modulated light L from the housing to the image display device 100 through the optical fiber.

Scan Section

The scan section 500 of the display unit 300A is arranged in the temple section 220, and the scan section 500 of the display unit 300B is arranged in the temple section 230. The scan section 500 is an optical scanner which two-dimensionally scans the modulated light L, which is emitted from the modulated light generation section 400, toward the deflection section 600.

The scan section 500 is an optical scanner which is capable of oscillating around two shafts, and includes a moving section 510 that includes a mirror 511, shaft sections 521 and 522 that support the moving section 510 such that the moving section 510 can oscillate (rotationally move) around a shaft J1, a drive frame section 530 that supports the shaft sections 521 and 522, shaft sections 541 and 542 that support the drive frame section 530 such that the drive frame section 530 can oscillate (rotationally move) around a shaft J2 which is perpendicular to the shaft J1, a frame-shaped support section 550 which supports the shaft sections 541 and 542, and a drive section which is not shown in the drawing, and which oscillates the drive frame section 530 around the shaft J2 against the support section 550 and oscillates the moving section 510 around the shaft J1 against the drive frame section 530, as illustrated in FIG. 6. According to the configuration, since the moving section 510 oscillates around both the shafts J1 and J2, it is possible to two-dimensionally scan the modulated light L which is reflected on the mirror 511. Meanwhile, the scan section 500 scans the modulated light L in the left and right directions (horizontal direction) of the frame 200 through oscillation around the shaft J1, and scans the modulated light L in the up and down directions (vertical direction) of the frame 200 through oscillation around the shaft J2.

In addition, the scan section 500 includes an inclination detection section 560 that detects the direction of the moving section 510. The inclination detection section 560 includes two piezoelectric substances 561 and 562 which are provided in the roots of the shaft sections 521 and 541, and detects the direction of the moving section 510 by acquiring an angle of inclination around the shaft J1 of the moving section 510 and an angle of inclination around the shaft J2 based on the change in resistances of the piezoelectric substances 561 and 562. Furthermore, the direction of the moving section 510 which is detected by the inclination detection section 560 is transmitted to the control section 800, and the control section 800 controls the drive of the modulated light generation section 400 such that the modulated light L is emitted from the modulated light generation section 400 at a timing which is associated with the direction of the moving section 510.

As above, if the optical scanner, which is capable of oscillating around two shafts is used as the scan section 500, the configuration and arrangement (particularly, alignment) of the scan section 500 become simple, and thus it is possible to reduce the size of the scan section 500.

Meanwhile, if it is possible to two-dimensionally scan the modulated light L, the configuration of the scan section 500 is not limited to the configuration according to the embodiment. For example, the scan section 500 may be configured to include two optical scanners that one-dimensionally scan the modulated light L, and to use a polygon mirror and a galvanometer mirror instead of the optical scanner.

The scan section 500, as described above, is located on a rear side rather than the modulated light generation section 400, and causes the modulated light L, which is emitted from the modulated light generation section 400 toward the rear (the free end sides of the temple sections 220 and 230) and to be incident into the mirror 511. In addition, the scan section 500 is arranged such that the mirror 511 is arranged toward the front (deflection section 600). If such an arrangement is performed, it is possible to increase the valid scan angle of the scan section 500 (a scan angle which enables the modulated light L to be led to the deflection section 600). Therefore, it is possible to generate a further bright image.

However, the arrangement and the direction of the scan section 500 is not particularly limited if it is possible to scan the modulated light L which is emitted from the modulated light generation section 400. In addition, in the embodiment, the modulated light L, which is scanned by the scan section 500, is configured to be directly incident into the deflection section 600. However, for example, the modulated light L, which is scanned by the scan section 500, may be configured to be incident into the deflection section 600 after being once reflected in a reflection member such as a mirror. In this case, for example, if optical properties are added to the reflection member, it is possible to generate a further clear image. Meanwhile, although the optical properties are not particularly limited, there may be a property in which an optical path of the modulated light L is corrected such that the diameter of the modulated light L becomes equal on a deflection surface of the deflection section 600.

Deflection Section

The deflection section 600 of the display unit 300A is provided in the front section 210, and is arranged to be located at the front of the right eye of the observer in a case of use. In contrast, the deflection section 600 of the display unit 300B is provided in the front section 210, and is arranged to be located at the front of the left eye of the observer in a case of use. The deflection sections 600 have sizes which are sufficient to cover the right eye and the left eye of the observer, and have functions of causing the modulated light L, which is scanned by the scan section 500, to be incident toward the eyes EY of the observer as image light.

The above-described deflection section 600 includes, for example, a hologram element (hologram mirror) which is one of diffraction grid. The hologram element is a semi-transmitting film that has a property which diffracts light in a specific wavelength band and causes light in wavelength band other than the specific wavelength band to penetrate therethough. Therefore, the observer can visually recognize an external world image and visually recognize an image (virtual image) which is formed by the image light. That is, it is possible to realize a see-through-type head mounted display.

Detection Section

The detection section 700 of the display unit 300A is provided on the right side of the nose pad 213, and is arranged in a location into which zero-order light L', which is light of the modulated light L that is regularly reflected in the deflection section 600, is incident (refer to FIG. 2). In the same manner, the detection section 700 of the display unit 300B is provided on the left side of the nose pad 213, and is arranged in a location into which the zero-order light L' of the modulated light L, which is regularly reflected in the deflection section 600, is incident (refer to FIG. 3). Hereinafter, the detection section 700 will be described in detail. Since the display units 300A and 300B have the same configuration, the display unit 300A will be described as a representative.

The detection section 700 includes, for example, a light receiving element 710 such as a photodiode. Furthermore, as illustrated in FIG. 7A, the light receiving element 710 is configured to receive the zero-order light L1' which is light acquired in such a way that modulated light L1 included in the modulated light L scanned by the scan section 500 is regularly reflected in the deflection section 600. Here, it is preferable that the modulated light L1 is located at an end section of the horizontal direction (end section of a central side of the front section 210) of the modulated light L scanned by the scan section 500. In other words, it is preferable that the modulated light L1 is light that is reflected in a scan area (deflection section 600) which is located on the side of the detection section 700 in the extending direction (direction in which the temple section 220 and the temple section 230 are separated from each other) of the front section 210 in the scan area which is formed by scan light that scans on the deflection section 600 in the light scanned by the scan section.

Therefore, it is possible to largely bend the optical path of the zero-order light L1' from diffracted light, and thus the degree of freedom of the arrangement of the light receiving element 710 increases. In addition, it is easy to arrange the light receiving element 710 in the nose pad 213, and thus it is possible to effectively use the nose pad 213. Meanwhile, the arrangement of the light receiving element 710 is not particularly limited, and the light receiving element 710 may be arranged in, for example, the shade section 212 if it is possible to receive the zero-order light L1'. However, it is better that the light receiving element 710 is not arranged between the deflection section 600 and the eye EY or in a location which is visually recognized by a wearer beyond the deflection section 600.

Here, in a mounting state in which the image display device 100 is mounted on the observer, force F, which is applied in a direction in which the temple sections 220 and 230 are separated from each other, is generated by the head H, and the temple section 220 is bent and deformed, as illustrated in FIG. 7B by the force F. Furthermore, according to the deformation of the temple section 220, the scan section 500, which is arranged in the temple section 220, is displaced against the deflection section 600, and the direction of an optical axis Loa of the modulated light L scanned by the scan section 500 is changed against the deflection section 600 according to the displacement. Meanwhile, for convenience of explanation, it is assumed that the force F is applied in the left and right directions (horizontal direction) of the frame.

Meanwhile, in a case in which the force F is applied to the frame 200, it is preferable that the temple section 220 is bent and deformed and the front section 210 is not substantially bent and deformed. Therefore, the deformation of the deflection section 600 is suppressed, and thus it is possible to display a clear image. In addition, even though the temple section 220 is bent and deformed, it is preferable that the relative locational relationship between the modulated light generation section 400 and the scan section 500, which are arranged together in the temple section 220, are not substantially changed. That is, it is preferable that the optical axis Loa of the scan section 500 is changed against the deflection section 600 in a state in which an incident angle of the modulated light L emitted from the modulated light generation section 400 toward the mirror 511 is fixed. Therefore, even though the temple section 220 is deformed, it is possible to cause the modulated light L emitted from the modulated light generation section 400 to be incident into the scan section 500, and it is possible to securely scan the modulated light L by the scan section 500.

That is, according to the existence/non-existence of the bending deformation and a degree of the bending deformation of the temple section 220, the optical angle of the mirror 511 (inclination around the shaft J1 for the support section 550) differs at a time in which the light receiving element 710 receives the zero-order light L1'. An example will be described. In a case of a natural state in which external force is not substantially given to the frame 200, the light receiving element 710 receives the zero-order light L1' in a time in which the mirror 511 is at an optical angle θ2, as illustrated in FIG. 8A. In contrast, in a case of a mounting state in which the temple section 220 is bent and deformed, the light receiving element 710 receives the zero-order light L1' in a time in which the mirror 511 is at an optical angle θ3, as illustrated in FIG. 8B.

As above, according to the existence/non-existence of the bending deformation and the degree of the bending deformation of the temple section 220, the optical axis Loa of the modulated light L scanned by the scan section 500 is changed. Therefore, if an image is displayed without taking the bending of the temple section 220 into consideration, the displayed image is deviated from an external world image beyond the deflection section 600 according to the shift of the optical axis Loa. Therefore, a sense of incompatibility is given to the wearer, and thus the sense of use of the image display device 100 is deteriorated. Here, the display unit 300A is not influenced by the existence/non-existence of the bending deformation and the degree of the bending deformation of the temple section 220, and thus the image is displayed in a proper location against the external world image beyond the deflection section 600.

For example, in a case in which the frame 200 is in the natural state and a design is made such that an image is displayed in a proper location against the external world image beyond the deflection section 600, the control section 800 initially acquires a degree in which the optical angle of the mirror 511 is changed against the natural state using the bending of the temple section 220. As illustrated in FIG. 9, it is possible to acquire change amount Δα (=|θ2−θ3|) of the optical angle by comparing inclination (deflection angle) around the shaft J1 of the mirror 511 in time in which the light receiving element 710 receives zero-order light L1' in the natural state with inclination (deflection angle) around the shaft J1 of the mirror 511 in time in which the light receiving element 710 receives zero-order light L1' in the mounting state.

Subsequently, the control section 800 acquires an angle in which the main surface of the mirror 511 is changed against the natural state and a degree of movement in which the scan section 500 is moved against the natural state according to the bending of the temple section 220. It is assumed that, if the temple section 220 is bent and deformed, the scan section 500 rotates centering on the bending point P of the frame 200, as illustrated in FIG. 10. Therefore, it is possible to acquire the change amount of the angle Δβ and movement amount Δd, respectively, by calculating backwards from the change amount Δα of the optical angle which is previously acquired. Furthermore, based on the change amount Δβ and the movement amount Δd which are acquired as described above, the control section 800 corrects timing in which the modulated light L is emitted from the modulated light generation section 400 against the drive of the scan section 500 (oscillation of the moving section 510). Therefore, an image is displayed in a proper location for the external world image beyond the deflection section 600. Meanwhile, it is not necessary to normally perform such a correction, and may be performed only once, for example, in a case in which electric power is supplied or every predetermined time interval.

As described above, according to the display unit 300A, configuration is made such that an image is displayed in a proper location against an external world image without being influenced whether or not the temple section 220 is bent and deformed and the degree of the bending deformation. Meanwhile, in the embodiment, description has been performed while taking only a case in which the temple section 220 is bent and deformed in the horizontal direction into consideration. However, in a case in which the temple section 220 is bent and deformed in the vertical direction, it is possible to correct the bending amount in the vertical direction as the same as above by storing the maximum value of the intensity of light which is received by the light receiving element 710 and time in which the zero-order light L1' is received (plotting while the maximum value of the intensity of light which is received by the light receiving element 710 is set to a longitudinal axis and time in which the zero-order light L1' is received is set to a lateral axis) for each horizontal scan, and assuming that a curved line which is acquired by smoothly connecting the values as the same graph as the horizontal direction.

In addition, in the display unit 300A, the shift of the location of an image according to the bending of the frame is detected in such a way that the light receiving element 710 receives the modulated light L which is necessary to drawing image. However, for example, the shift of the location of an image according to the bending of the frame may be detected by separately arranging a light source that emits infrared rays (IR) which is not used to draw the image and receiving the infrared rays by the light receiving element 710. In this case, for example, it is possible to differentiate an incident angle of infrared rays into the mirror 511 from an incident angle of the modulated light L, and thus the degree of freedom of the arrangement of the light receiving element 710 further increases.

Second Embodiment

Figure 11:
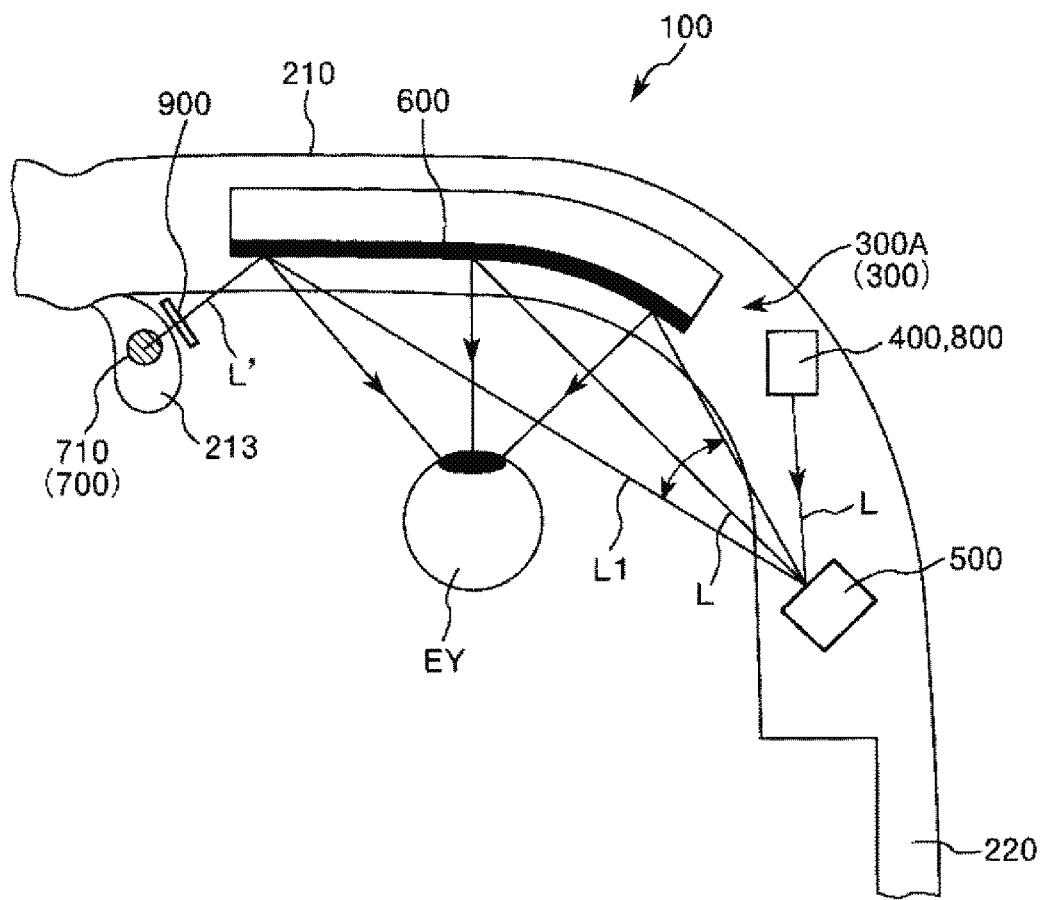
FIG. 11 is a schematic configuration diagram illustrating an image display device according to a second embodiment of the invention.

FIG. 11 is a schematic configuration diagram illustrating an image display device according to a second embodiment of the invention.

Hereinafter, the second embodiment will be described based on difference from the above-described embodiment, and the same matters will not be described.

The second embodiment is almost the same as the above-described first embodiment excepting the configuration of the display unit. Meanwhile, in FIG. 11, the same reference symbols are attached to the same components as in the same reference symbols are attached to the same components as in the above-described embodiment. In addition, hereinafter, a display unit 300A will be described which has the same configuration as the display unit 300B.

As illustrated in FIG. 11, the display unit 300A according to the embodiment includes an optical filter (optical section) 900 which is provided on the optical path of the zero-order light L1' between the deflection section 600 and the detection section 700. The optical filter 900 is a narrowband optical filter, and has a function of causing light in a wavelength region, which is the same as that of any one of red laser light emitted from the light source 410R, green laser light emitted from the light source 410G, and blue laser light emitted from the light source 410B, to penetrate therethrough and cutting off light in other wavelength regions. Therefore, for example, light from the outside is suppressed from being mistakenly detected by the detection section 700, and thus it is possible to perform more accurate correction by the control section 800.

It is possible to realize the same advantage as in the above-described first embodiment in the second embodiment.

Third Embodiment

Figure 12:
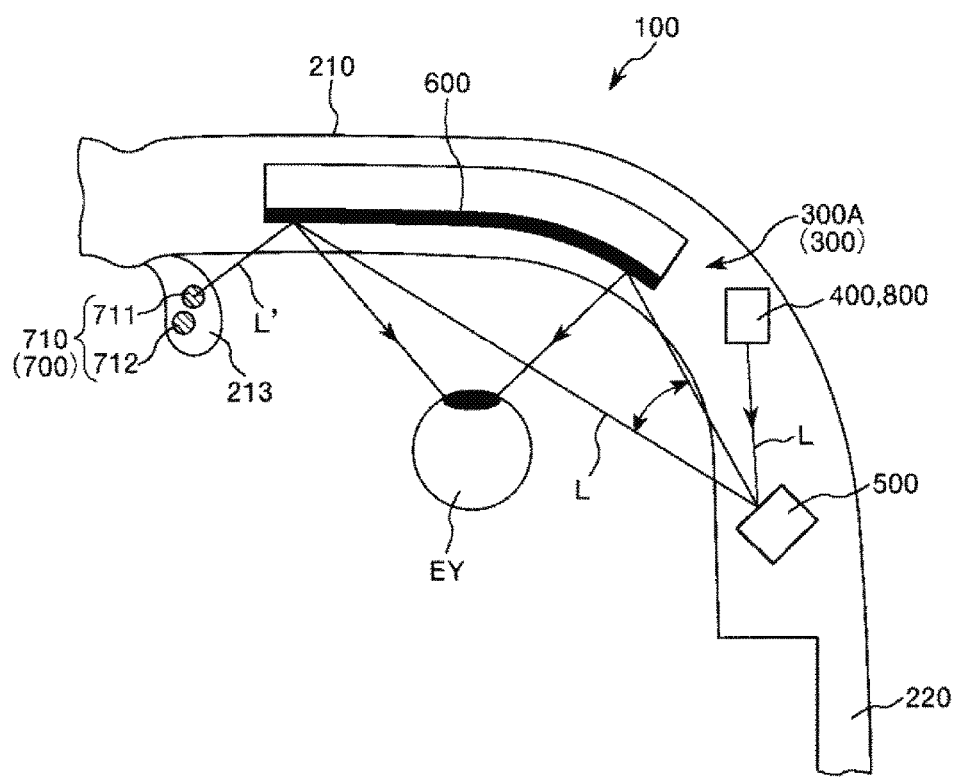
FIG. 12 is a schematic configuration diagram illustrating an image display device according to a third embodiment of the invention.
Figure 13:
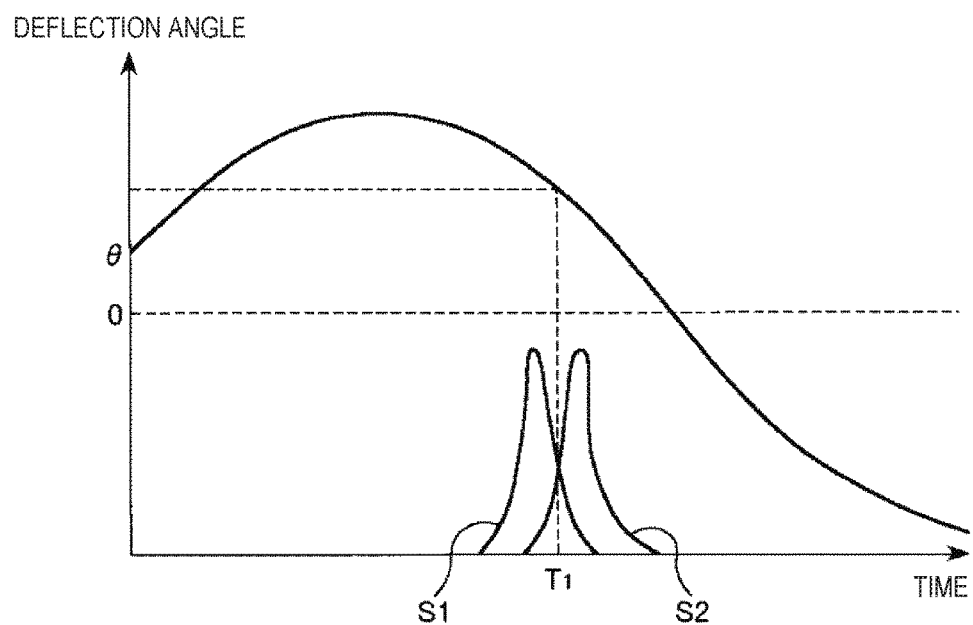
FIG. 13 is a graph illustrating detection of zero-order light by a detection section.

FIG. 12 is a schematic configuration diagram illustrating an image display device according to a third embodiment of the invention. FIG. 13 is a graph illustrating detection of the zero-order light by the detection section.

Hereinafter, the third embodiment will be described based on difference from the above-described embodiment, the same matters will not be described.

The third embodiment is almost the same as the above-described first embodiment excepting the configuration of the display unit. Meanwhile, in FIG. 12, the same reference symbols are attached to the same components as in the above-described embodiment. In addition, although the display unit 300A will be described below, the display unit 300A has the same configuration as the display unit 300B.

As illustrated in FIG. 12, in the display unit 300A according to the embodiment, the detection section 700 includes two light receiving elements 711 and 712 which stand in a line in the horizontal direction (approximately the same direction as the scan direction of the modulated light L around the shaft J1). With the configuration, if the zero-order light L' crosses the light receiving elements 711 and 712 in the horizontal direction, timings are deviated due to the light receiving elements 711 and 712, and thus outputs S1 and S2 are generated, as illustrated in FIG. 13. Therefore, for example, if it is assumed that the zero-order light L' in time $T_1$ in which the output values of the light receiving elements 711 and 712 are equal is determined to be zero-order light L1', it is possible to more accurately acquire the optical angle θ of the mirror 511 at that time, and it is possible to perform more accurate correction by the control section 800.

Meanwhile, in the embodiment, description is performed by taking only the bending deformation of the temple section 220 in the horizontal direction into consideration. However, in a case in which the bending deformation of the temple section 220 in the vertical direction is taken into consideration, two light receiving elements which stand in a line in the vertical direction (approximately the same direction as the scan direction of the modulated light L around the shaft J2) may be arranged in addition to the light receiving elements 711 and 712.

It is possible to realize the same advantage as in the above-described first embodiment in the third embodiment.

Fourth Embodiment

Figure 14:
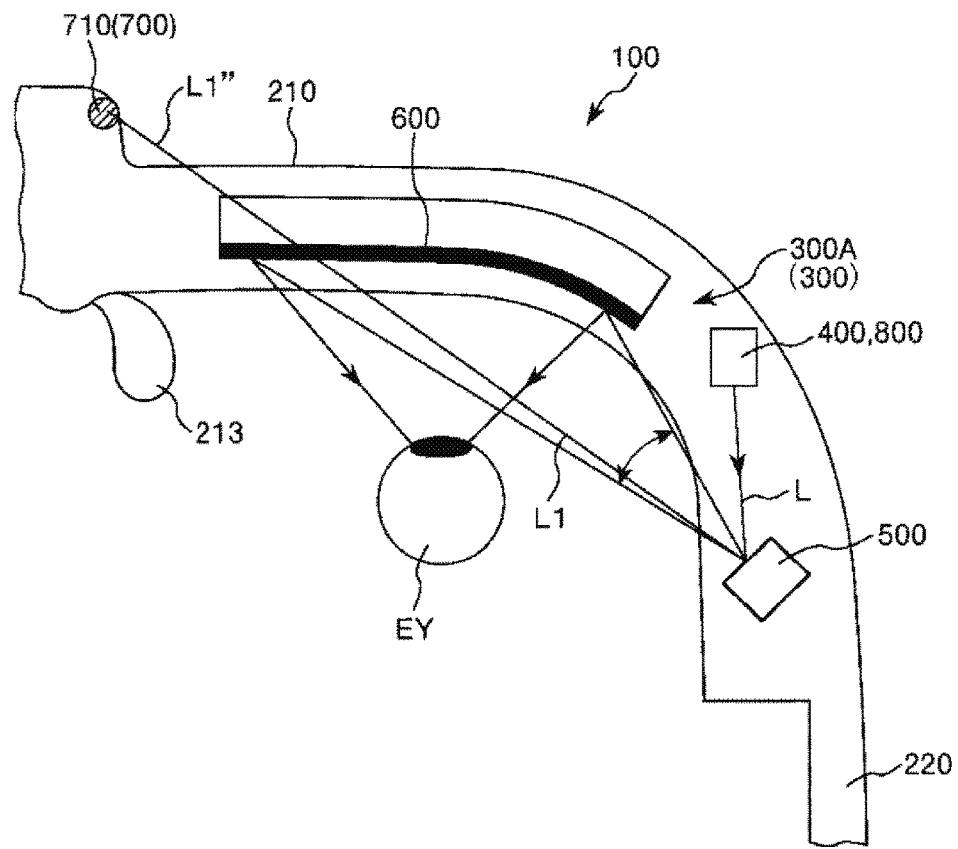
FIG. 14 is a schematic configuration diagram illustrating an image display device according to a fourth embodiment of the invention.

FIG. 14 is a schematic configuration diagram illustrating an image display device according to a fourth embodiment of the invention.

Hereinafter, the fourth embodiment will be described based on difference from the above-described embodiment, the same matters will not be described.

The fourth embodiment is almost the same as the above-described first embodiment excepting the configuration of the display unit. Meanwhile, in FIG. 14, the same reference symbols are attached to the same components as in the above-described embodiment. In addition, although the display unit 300A will be described below, the display unit 300A has the same configuration as the display unit 300B.

As illustrated in FIG. 14, in the display unit 300A according to the embodiment, the light receiving element 710 of the detection section 700 is configured to receive transmitted light L1'', which penetrates the deflection section 600, of the modulated light L1 included in the modulated light L scanned by the scan section 500. Meanwhile, in a case of the embodiment, the deflection section 600 is not limited to the hologram element, and, for example, a half mirror having an aspherical surface may be used.

It is possible to realize the same advantage as in the above-described first embodiment in the fourth embodiment.

Fifth Embodiment

Figure 15A:
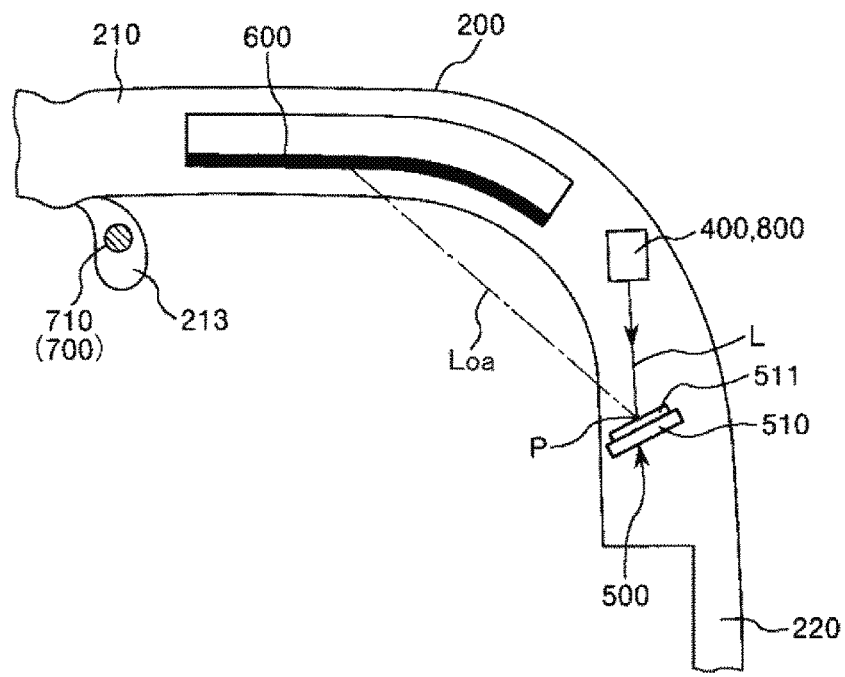
FIGS. 15A and 15B are schematic configuration diagrams illustrating an image display device according to a fifth embodiment of the invention.
Figure 15B:
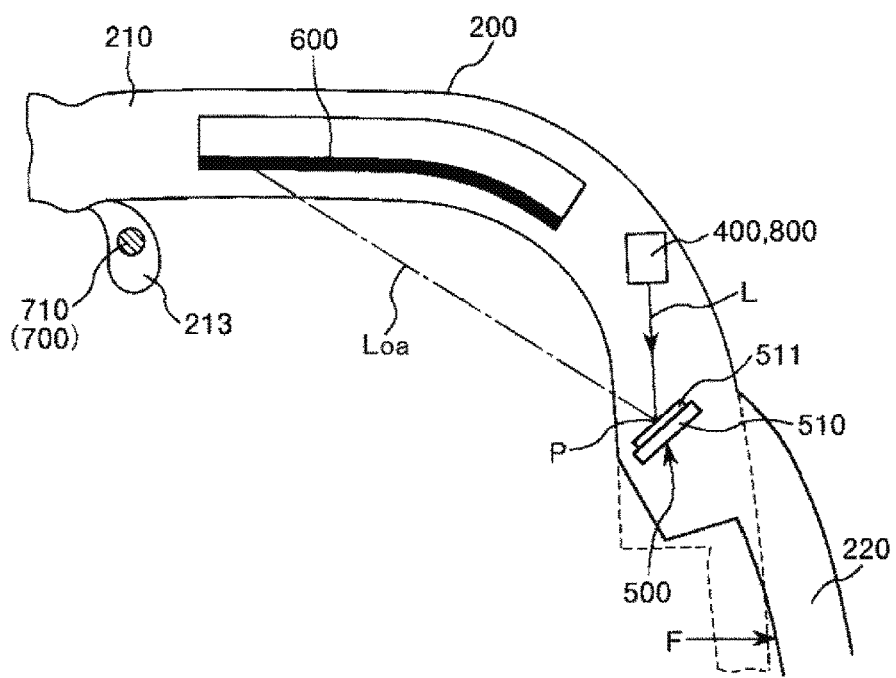

FIGS. 15A and 15B are schematic configuration diagrams illustrating an image display device according to a fifth embodiment of the invention.

Hereinafter, the fifth embodiment will be described based on difference from the above-described embodiment, the same matters will not be described.

The fifth embodiment is almost the same as the above-described first embodiment excepting the location of a bending point of the frame. Meanwhile, in FIGS. 15A and 15B, the same reference symbols are attached to the same components as in the above-described embodiment. In addition, although the display unit 300A will be described below, the display unit 300A has the same configuration as the display unit 300B.

In the frame 200 according to the embodiment, a bending point P, acquired in a case in which force F is applied, substantially matches with the center of the mirror 511 of the scan section 500. Therefore, if the force F is applied in the natural state illustrated in FIG. 15A, the temple section 220 is bent and deformed using the bending point P (the center of the mirror 511) as a fulcrum, as illustrated in FIG. 15B. If the temple section 220 is deformed as above, the scan section 500 only rotates (turns) using the center of the mirror 511 as a shaft, and thus only the optical axis Loa is changed against the deflection section 600, the location of the mirror 511 (the central location of the mirror 511) is not substantially changed. In other words, the optical axis Loa of the light scanned by the scan section 500 is changed against the deflection section 600 while a direction in which the modulated light L emitted from the modulated light generation section 400 is incident into the front section 210 (the relative locational relationship between the modulated light generation section 400 and the front section 210) is fixed. That is, even though the temple section 220 is bent and deformed, the movement amount Δd, which is described in the first embodiment, is 0. Therefore, in a case in which correction is performed by the control section 800, the movement amount Ad may not be taken into consideration, thereby realizing further simple correction.

It is possible to realize the same advantage as in the above-described first embodiment in the fifth embodiment.

Sixth Embodiment

Figure 16A:
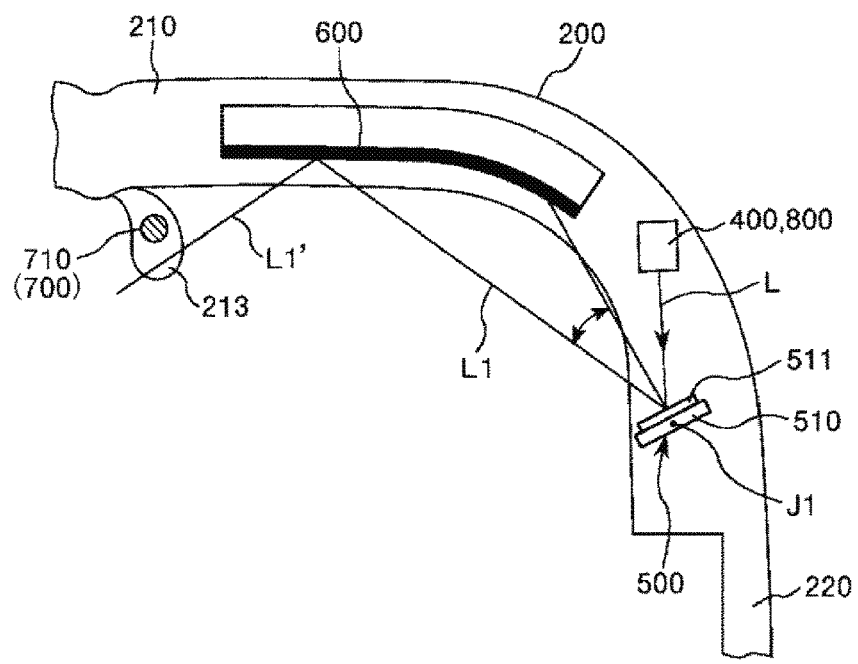
FIGS. 16A and 16B are schematic configuration diagrams illustrating an image display device according to a sixth embodiment of the invention.
Figure 16B:
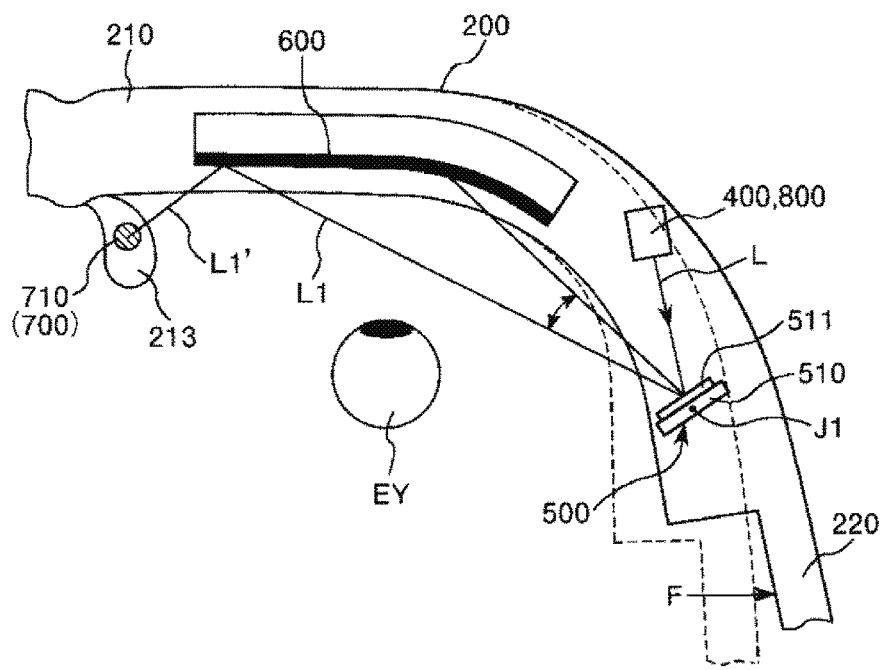

FIGS. 16A and 16B are schematic configuration diagrams illustrating an image display device according to a sixth embodiment of the invention.

Hereinafter, the sixth embodiment will be described based on difference from the above-described embodiment, and the same matters will not be described.

The sixth embodiment is almost the same as the above-described first embodiment excepting the configuration of the display unit. Meanwhile, in FIGS. 16A and 16B, the same reference symbols are attached to the same components as in the above-described embodiment. In addition, although the display unit 300A will be described below, the display unit 300A has the same configuration as the display unit 300B.

As illustrated in FIG. 16A, in the display unit 300A according to the embodiment, the light receiving element 710 does not receive the zero-order light L1' in the natural state. In contrast, as illustrated in FIG. 16B, in the mounting state in which certain fixed force F is applied, the light receiving element 710 receives the zero-order light L1'. Therefore, if the light receiving element 710 receives the zero-order light L1', the control section 800 determines that the temple section 220 is bent and deviation is generated in an image display location, and performs correction such that the image location becomes a proper location. In particular, in the embodiment, the zero-order light L1' is acquired in such a way that the modulated light L1 is regularly reflected, which is scanned at the end section (end section of the central side of the front section 210) in the horizontal direction, of the modulated light L scanned by the scan section 500. Therefore, it is easy to arrange the light receiving element 710 such that the light receiving element 710 does not receive the zero-order light L1' in the natural state and receives the zero-order light L1' in the mounting state.

It is possible to realize the same advantage as in the above-described first embodiment in the sixth embodiment.

Meanwhile, on the contrary to the embodiment, the light receiving element 710 maybe arranged such that the light receiving element 710 receives the zero-order light L1' in the natural state, and does not receive the zero-order light L1' in the mounting state.

Hereinabove, the image display device according to the invention has been described based on the embodiments with reference to the drawings. However, the invention is not limited thereto. For example, in the image display device according to the invention, it is possible to replace the configurations of the respective sections by arbitrary configurations which have the same functions, and it is possible to add other arbitrary configurations.

In addition, the image display device according to the invention is not limited to a case in which the invention is applied to the glasses-type head mounted display if the image display device forms a virtual image as an image which is visually recognized by the observer. For example, the invention can be applied to a helmet-type head mounted display, a headset-type head mounted display, or an image display device in the form which is supported by the body, such as the neck or the shoulder, of the observer. In addition, the above-described embodiment illustrates a case in which the entire image display device is mounted on the head of the observer as an example. However, the image display device may include a portion which is mounted on the head of the observer and a portion which is mounted or carried on a portion other than the head of the observer.

In addition, in the above-described embodiment, the configuration of a both eye-type transmission-type head mounted display has been described as a representative. However, the invention may be applied to, for example, the configuration of a non-transmission-type head mounted display in which outside view is blocked in a state in which the observer wears the head mounted display. In addition, the image display device according to the invention may include a device, such as a speaker or a headphone, which outputs sounds.

The entire disclosure of Japanese Patent Application No. 2015-142401, filed Jul. 16, 2015 is expressly incorporated by reference herein.

What is claimed is:

1. An image display device, which is used by being mounted on an observer, comprising:
    a frame body that includes a front frame and a temple, the temple being connected to the front frame;
    a scanner that is arranged in the frame body, the scanner being configured to scan source light which is emitted from a light source so as to provide scanned light;
    a deflector that is arranged directly adjacent to the front frame, the deflector being configured to deflect the scanned light so as to provide deflected light toward eyes of the observer in a first direction, the deflector being configured to reflect the scanned light so as to provide reflected light in a second direction that is different from the first direction; and
    a detector that is arranged in the frame body, the detector being configured to detect the reflected light,
    wherein the deflector is provided between the scanner and the detector in a light path of the scanned light and the reflected light.

2. The image display device according to claim 1,
    wherein the deflector is a hologram element, and
    wherein the reflected light is zero-order light that is generated by regularly reflecting the scanned light by the hologram element.

3. The image display device according to claim 1, further comprising:
    a drive controller that is configured to control drive of the light source based on a detection result of the detector.

4. The image display device according to claim 1, further comprising:
    an optical member which is located between the deflector and the detector in the light path, and
    the reflected light passes through the optical member.

5. The image display device according to claim 1,
    wherein the scanner includes a reflector configured to reflect the source, and wherein an optical axis of the scanned light is changed while the scanner scans the source light so that an optical light of the reflected light, which is detected by the detector, is changed according to the optical axix of the scanned light.

6. The image display device according to claim 5, wherein when the temple is deformed, the optical axis of the scanned light is changed.

7. The image display device according to claim 5, wherein the optical axis of the scanned light is changed while an incident angle of the source light on the scanner is fixed.

8. The image display device according to claim 5, wherein the reflector has a flat surface in which the source light is incident,
when a facing angle of the reflector with respect to the deflector is changed while a relative locational relationship between the light source and a center of the reflector is fixed, the optical axis of the scanned light is changed.

9. The image display device according to claim 1, wherein the detector is configured to detect the reflected light that is generated by reflecting the scanned light at an area of the deflector directly adjacent to the detector.

10. An image display device, which is used by being mounted on an observer, comprising:
a frame body that includes a front frame and a temple, the temple being connected to the front frame;
a scanner that is arranged in the frame body, the scanner being configured to scan source light which is emitted from a light source so as to provide scanned light;
a deflector that is arranged directly adjacent to the front frame, the deflector being configured to deflect the scanned light so as to provide deflected light toward eyes of the observer in a first direction, the scanned light passing through the deflector as passed light in a second direction that is different from the first direction; and
a detector that is arranged in the frame body, the detector being configured to detect the passed light,
wherein the deflector is provided between the scanner and the detector in a light path of the scanned light and the passed light.

11. The image display device according to claim 10, further comprising:
a drive controller that is configured to control drive of the light source based on a detection result of the detector.

12. The image display device according to claim 10, further comprising:
an optical member which is located between the deflector and the detector in the light path, and
the passed light passes through the optical member.

13. The image display device according to claim 10, wherein the scanner includes a reflector configured to reflect the source, and
wherein an optical axis of the scanned light is changed while the scanner scans the source light so that an optical light of the passed light, which is detected by the detector, is changed according to the optical axis of the scanned light.

14. The image display device according to claim 13, wherein when the temple is deformed, the optical axis of the scanned light is changed.

15. The image display device according to claim 13, wherein the optical axis of the scanned light is changed while an incident angle of the source light on the scanner is fixed.

16. The image display device according to claim 13, wherein the reflector has a flat surface in which the source light is incident,
when a facing angle of the reflector with respect to the deflector is changed while a relative locational relationship between the light source and a center of the reflector is fixed, the optical axis of the scanned light is changed.

17. The image display device according to claim 10, wherein the detector is configured to detect the passed light that is generated by passing the scanned light through an area of the deflector directly adjacent to the detector.

* * * * *